(12) United States Patent
Baney et al.

(10) Patent No.: US 6,788,395 B2
(45) Date of Patent: Sep. 7, 2004

(54) COHERENT ANALYZER FOR MULTI-PORT OPTICAL NETWORKS

(75) Inventors: Douglas M. Baney, Palo Alto, CA (US); Wayne V. Sorin, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 68 days.

(21) Appl. No.: 10/081,102

(22) Filed: Feb. 20, 2002

(65) Prior Publication Data

US 2003/0156275 A1 Aug. 21, 2003

(51) Int. Cl.[7] .............................................. G01N 21/00
(52) U.S. Cl. ..................................................... 356/73.1
(58) Field of Search .................... 356/73.1; 385/14–20; 324/637–638, 601–618; 702/73–86, 108–117

(56) References Cited

U.S. PATENT DOCUMENTS 5,764,348 A * 6/1998 Bloom ....................... 356/73.1

* cited by examiner

Primary Examiner—Tu T. Nguyen

(57) ABSTRACT

An optical interface device for use in coherent testing of a device for its response to a stimulus signal. The interface includes a reference signal generator for generating a reference signal and a stimulus signal from the light signal input to the interface. A first optical switch routes the stimulus signal to one of the device test ports. A second optical switch routes a light signal from the device under test to the test signal output port. A plurality of optical routers are utilized for connecting the device test ports to the first and second switches. The output of the optical routers also provides a signal related to the intensity of the light signal leaving the device test port for use in correcting the data for variations in intensity in the stimulus light signal. A polarization synthesizer for setting the polarization state of the stimulus signal may also be included.

9 Claims, 2 Drawing Sheets

COHERENT ANALYZER FOR MULTI-PORT OPTICAL NETWORKS

FIELD OF THE INVENTION

The present invention relates to an apparatus for analyzing the response of optical devices, and more particularly, to an apparatus for analyzing a two port optical device without requiring that the device be reconnected during the measurement process.

BACKGROUND OF THE INVENTION

There are a large number of optical devices that have two or more ports which receive and transmit light signals. Optical filters, amplifiers, and multiplexers are but a few examples of such devices. These optical components require specific portal characteristics to allow their use in optical networks. Properties such as optical insertion loss, polarization dependence, chromatic dispersion, and reflection coefficients directly affect the performance of optical networks that rely on these devices. Accordingly, equipment and protocols for efficiently testing such devices are required both in research and manufacturing.

To adequately characterize these components, coherent measurement techniques are required. For coherent measurements a stimulus signal is applied to the device and a response signal is extracted therefrom. The response signal must be mixed with a local oscillator signal that has a coherent relationship with the stimulus signal.

To simplify the following discussion, consider the case of a two-port device such as an optical amplifier. To characterize the device a signal is applied to a first port, and the output from the second port together with the signal reflected back from the first port are analyzed. The phase and polarization of the response signal must be measured with respect to that of the input signal to characterize the device. After the first port has been characterized, the roles of the two ports are reversed. Prior art systems do not provide a means for carrying out these coherent measurement functions.

Broadly, it is the object of the present invention to provide an improved apparatus and method for characterizing optical devices that provides coherent measurements.

These and other objects of the present invention will become apparent to those skilled in the art from the following detailed description of the invention and the accompanying drawings.

SUMMARY OF THE INVENTION

The present invention is an optical interface device for use in testing a device for its response to a stimulus signal. The interface includes a stimulus input port for receiving a light signal, a test signal output port, and a plurality of device test ports. Each device test port couples a light signal from the interface to a port of a device under test, and couples a light signal from the port of the device under test to the interface. The interface includes a reference signal generator for generating a reference signal and a stimulus signal from the light signal input to said interface. A first optical switch routes the stimulus signal to one of the device test ports, the first optical switch having one output port corresponding to each of the device test ports that is capable of coupling the stimulus signal to a device under test. A second optical switch routes a light signal from the device under test to the test signal output port. The second optical switch has a plurality of input ports, each input port being connected to a corresponding one of the device test ports, and a switch output port coupled to the test signal output port. The interface utilizes a plurality of optical routers, one corresponding to each of the device test ports. Each optical router connects an output of the first optical switch to a corresponding one of the device test ports and connects that device test port to a corresponding one of the second optical switch input ports. The output of the optical routers also provides a signal related to the intensity of the light signal leaving the device test port for use in correcting the data for variations in intensity in the stimulus light signal. The interface may include an optical delay circuit for generating an optical delay between the reference signal and the stimulus signal. The reference signal is preferably combined within the interface with the signal leaving the switch output port of the second optical switch prior to that signal being coupled to the test signal output port. The interface may also include a polarization synthesizer for setting the polarization state of the stimulus signal.

DETAILED DESCRIPTION OF THE INVENTION

Figure 1:
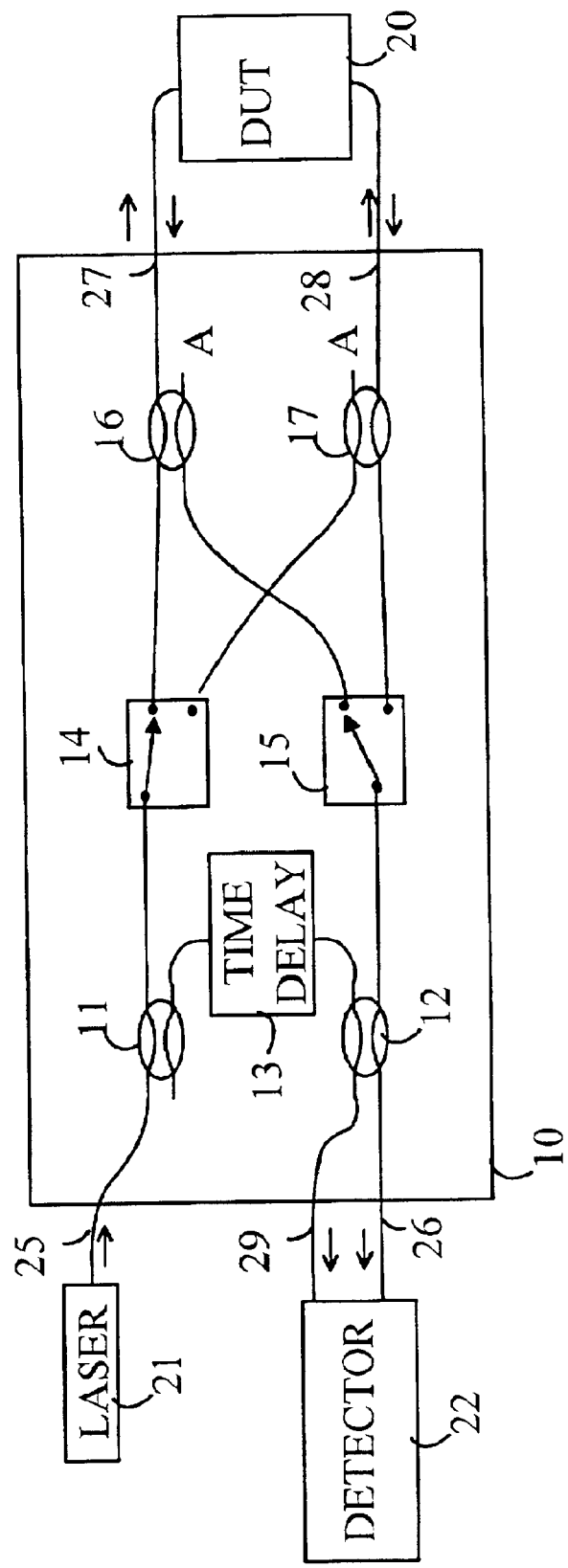
FIG. 1 is a block diagram of a coherent analyzer 10 according to the present invention connected to a device under test (DUT)

The manner in which the present invention provides its advantages can be more easily understood with reference to FIG. 1, which is a block diagram of a coherent analyzer 10 according to the present invention connected to a device under test (DUT) via ports 27 and 28. To simplify the following discussion, coherent analyzer 10 and DUT 20 have only two ports. Embodiments having additional ports will be discussed in more detail below.

The stimulus signal that is applied to the DUT is generated by a laser 21 and received on port 25. A reference signal that is coherently related to the stimulus signal is generated by beam optical coupler 11 and optical time delay 13. Optical time delay 13 compensates for delays in the optical paths and the DUT. A two-port switch 14 determines which port of the DUT receives the stimulus signal. A second two-port switch 15 determines which port of the DUT is connected to detector 22. Detector 22 is preferably a balanced detector and hence also receives the coherent reference signal on port 29. In the embodiment shown in FIG. 1, detector 22 receives the signal from the DUT after mixing the signal with the reference signal using coupler 13. However, arrangements in which the reference signal and the response signal from the DUT are provided separately to the detector can also be practiced. In addition, coupler 12 may be part of detector 22.

Couplers 16 and 17 perform two functions. First, the couplers provide a means for connecting each DUT to either the stimulus signal for applying a signal to that port or connecting that port to the detector for measuring the signal leaving the port in question. Second, the couplers split off a portion of the stimulus signal to a port "A". Power variations in laser 21 can be mistaken for so-called relative intensity noise (RIN) or slow power fluctuations in the DUT. Such artifacts can be normalized out by measuring the signal strength at the points designated by "A" as shown in FIG. 1.

This information is fed back for processing by the detector for correction to the measured DUT signal.

The various light paths shown in FIG. 1 can be implemented in an optical fiber such as Corning SMF-28, or in polarization preserving fiber or in free-space bulk-optics. As noted above, the delay circuit is to provide the appropriate delay, which may be selectable or continuously adjustable. Selection can be made by way of a single or pair, or series of optical switches with appropriate optical delays connected to their ports. In most cases the delay is short, being similar in length to the shortest path available between a stimulus port and response port path. However, for some DUTs an increase in the delay may be necessary to accommodate large optical delays that may occur within the DUT.

The detector may operate on a single polarization; however, in the preferred embodiment of the present invention, the detector is a polarization diversity receiver that allows proper measurement of the device characteristics regardless of the polarization orientation of the response signal. By tapping the reference signal and then combining it into the receiver, a coherent measurement of the device is possible.

Coherent measurements made with the present invention can provide a significant increase in the dynamic range of the measurement. For the purposes of this discussion, the dynamic range is the range between the minimum reflectivity (or transmission) measurable and maximum measurable reflectivity (or transmission). In those cases in which the DUT attenuates the signal significantly, the net received signal is boosted by the reference signal thereby increasing the minimum detectable signal from the DUT.

Figure 2:
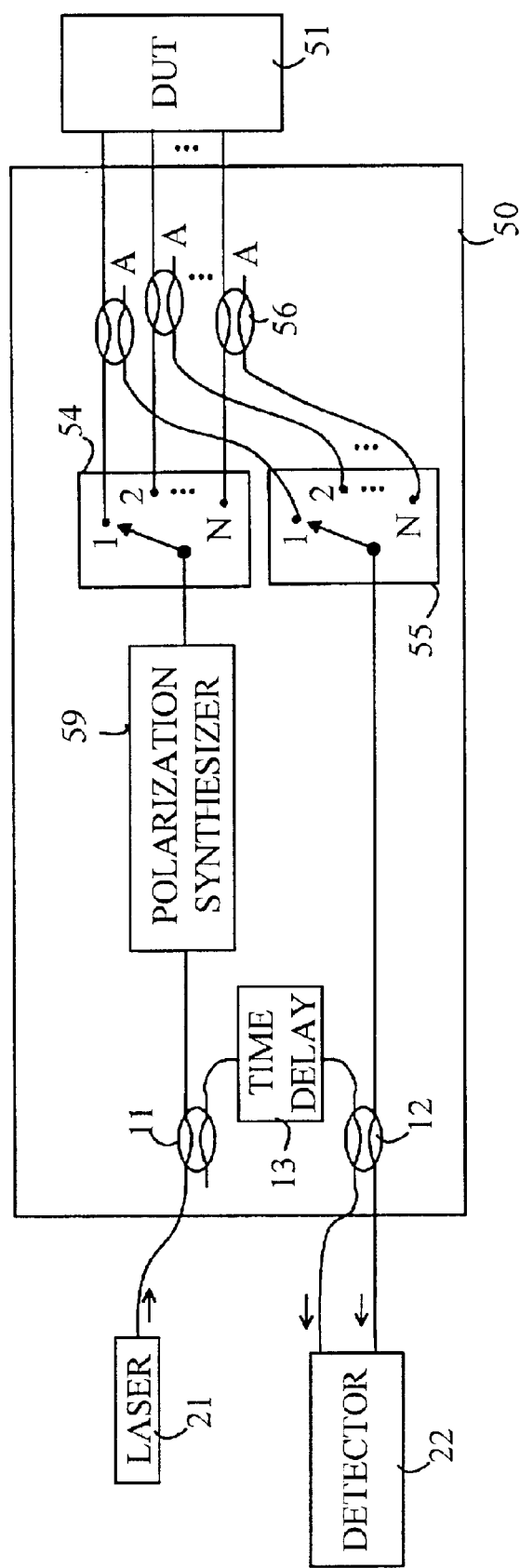
FIG. 2 is a block diagram of a coherent analyzer 50 according to the present invention connected to an N-port DUT 51.

The embodiment of the present invention shown in FIG. 1 provides a facility for testing two ports of a DUT. However, embodiments of the invention for testing a DUT having N ports, where N>2, can also be constructed. Refer now to FIG. 2, which is a block diagram of a coherent analyzer 50 according to the present invention, connected to an N-port DUT 51. To simplify the following discussion, those elements of analyzer 50 that serve the same function as elements shown in FIG. 1 have been given the same numerical designations and will not be discussed in detail here. Analyzer 50 utilizes N-port switches 54 and 55 in place of the 2-port switches shown in FIG. 1 at 14 and 15, respectively. Switch 54 applies the stimulus signal to a selected port of DUT 51, and switch 55 selects one of the ports of DUT 50 for connection to the detector. A coupler 56 is provided for each port of the DUT in a manner analogous to that described above. Each coupler serves a routing function for connecting a port of the DUT to the detector via switch 55. In addition, each coupler provides a signal "A" for measuring the amplitude of the stimulus signal currently applied to the DUT.

Many optical devices are sensitive to the polarization state of the stimulus signal. In addition, many of these devices provide output signals whose polarization state must be characterized. The present invention may be utilized to analyze such a device by providing a polarization synthesizer 59 so that the device can be subjected to a variety of polarization states. Polarization synthesizer 59 provides a signal of known polarization to the DUT. The polarization state may be changed by providing a control signal to the synthesizer. Alternatively, the synthesizer may sequence through a predetermined series of polarization states to provide a time-varying known polarization test signal. In such measurements, a detector having a polarization diversity receiver can function as a polarization meter, which when applied with the polarization synthesizer permits characterization of the complete Jones matrix of the test device. Typically only a few polarization states are required to fully understand the polarization dependencies of typical linear optical components.

The embodiments of the present invention shown in FIGS. 1 and 2 utilize optical couplers between the switches and the DUT to perform signal routing functions. However, other forms of optical routers can be employed. For example, the couplers can be replaced by optical circulators to lower optical losses. Couplers are preferred because of the lower cost of such devices compared to optical circulators.

Various modifications to the present invention will become apparent to those skilled in the art from the foregoing description and accompanying drawings. Accordingly, the present invention is to be limited solely by the scope of the following claims.

What is claimed is:

1. An optical interface device comprising:
a stimulus input port for receiving a light signal;
a test signal output port;
a plurality of device test ports, each device test port coupling said interface to a port of a device under test;
a reference signal generator for generating a reference signal and a stimulus signal from said light signal;
a first optical switch for routing said stimulus signal to one of said device test ports, said first optical switch having one output port corresponding to each of said device test ports;
a second optical switch having a plurality of input ports, each input port being connected to a corresponding one of said device test ports, and a switch output port coupled to said test signal output port; and
a plurality of optical routers, one corresponding to each of said device test ports, each optical router connecting an output of said first optical switch to a corresponding one of said device test ports and connecting that device test port to a corresponding one of said second optical switch input ports.

2. The interface of claim 1 wherein one of said optical routers comprises an optical coupler.

3. The interface of claim 2 wherein an output of one of said optical routers provides a signal that is related in intensity to the intensity of leaving said device test port corresponding to that one of said optical routers.

4. The interface of claim 1 wherein one of said optical routers comprises an optical circulator.

5. The interface of claim 1 further comprising an optical delay circuit for generating an optical delay between said reference signal and said stimulus signal.

6. The interface of claim 1 further comprising an optical combiner for combining said reference signal with a signal leaving said switch output port of said second optical switch prior to that signal being coupled to said test signal output port.

7. The interface of claim 1 further comprising a reference signal output port, said reference signal being coupled to said reference signal output port.

8. The interface of claim 1 further comprising a polarization synthesizer for setting the polarization state of said stimulus signal.

9. The interface of claim 1 further comprising a polarization diversity receiver coupled to said test signal output port.

* * * * *